US009223045B2

(12) United States Patent
Naqvi

(10) Patent No.: US 9,223,045 B2
(45) Date of Patent: Dec. 29, 2015

(54) METHOD AND APPARATUS FOR OBJECT/MATERIAL DETECTION

(75) Inventor: Waseem Naqvi, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 660 days.

(21) Appl. No.: 13/480,027

(22) Filed: May 24, 2012

(65) Prior Publication Data

US 2012/0300067 A1     Nov. 29, 2012

Related U.S. Application Data

(60) Provisional application No. 61/489,680, filed on May 25, 2011.

(51) Int. Cl.
*G08B 13/00* (2006.01)
*G01V 3/12* (2006.01)

(52) U.S. Cl.
CPC ........................ *G01V 3/12* (2013.01)

(58) Field of Classification Search
CPC ....... G01S 5/0289; G01S 7/411; G01S 7/412; G01S 7/415; G01S 7/003; G01S 13/04; G01S 13/10; G01S 13/87; G01S 13/872; G01S 13/867; G08B 13/2491; G08B 13/2494; G01V 3/12
USPC .................................. 348/143; 340/541, 567
See application file for complete search history.

(56) References Cited

U.S. PATENT DOCUMENTS

| | | | |
|---|---|---|---|
| 3,815,131 A * | 6/1974 | Dautel et al. ..................... 342/28 |
| 6,057,761 A * | 5/2000 | Yukl ........................... 340/568.1 |
| 6,831,590 B1 | 12/2004 | Steinway et al. |
| 7,633,518 B2 * | 12/2009 | Beevor et al. .................. 348/156 |
| 2004/0080415 A1 * | 4/2004 | Sorensen ....................... 340/541 |
| 2005/0230604 A1 * | 10/2005 | Rowe et al. .................... 250/221 |
| 2006/0170768 A1 * | 8/2006 | Riley ............................. 348/143 |
| 2008/0018464 A1 * | 1/2008 | van Doorn et al. ............ 340/553 |
| 2008/0143529 A1 * | 6/2008 | Gauvreau ...................... 340/567 |
| 2008/0185525 A1 * | 8/2008 | Lyubchik et al. .............. 250/342 |
| 2009/0019957 A1 * | 1/2009 | Eisenman et al. ............... 73/866 |
| 2009/0310571 A1 * | 12/2009 | Matischek et al. ............ 370/336 |
| 2010/0295718 A1 * | 11/2010 | Mohamadi et al. ............. 342/21 |
| 2011/0169637 A1 * | 7/2011 | Siegler, II .......... G08B 13/2494  340/541 |
| 2013/0050007 A1 * | 2/2013 | Ammar ........................... 342/22 |

FOREIGN PATENT DOCUMENTS

WO     WO 99/21148 A1    4/1999
WO     WO 2004/003591 A1  1/2004

OTHER PUBLICATIONS

Lee et al. "Performance Analysis of Wireless Link Quality in Wireless Sensor Networks" IEEE 2010.*

(Continued)

*Primary Examiner* — Sath V Perungavoor
*Assistant Examiner* — Nathnael Aynalem
(74) *Attorney, Agent, or Firm* — Daly, Crowley, Mofford and Durkee, LLP

(57) ABSTRACT

Methods and apparatus to compare the size of a target from the first sensor information with the size of the target from the second sensor information to determine whether an anomaly exists based upon the size comparison. In one embodiment, the size of the target from the first sensor information is affected by dielectric constants for at least one material of interest associated with the target.

22 Claims, 13 Drawing Sheets

(56) References Cited

OTHER PUBLICATIONS

Notification of Transmittal of the Notification Concerning Transmittal of International Preliminary Report on Patentability (Chapter I of the Patent Cooperation Treaty), PCT/US2012/039355, date of mailing Dec. 5, 2013, 1 page.
International Preliminary Report of Patentability, PCT/US2012/039355, Dec. 5, 2013, 7 pages.

Notification of Transmittal of the International Search Report and the Written Opinion of the International Searching Authority, or the Declaration, PCT/US2012/039355, date of mailing Apr. 19, 2013, 4 pages.

Written Opinion of International Searching Authority, PCT/US2012/039355, date of mailing Apr. 19, 2013, 8 pages.

* cited by examiner

METHOD AND APPARATUS FOR OBJECT/MATERIAL DETECTION

CROSS REFERENCE TO RELATED APPLICATIONS

The present application claims the benefit of U.S. Provisional Patent Application No. 61/489,680, filed on May 25, 2011, which is incorporated herein by reference.

BACKGROUND

As is known in the art, there are a variety of interrogation systems to actively or passively detect firearms, explosive devices, contraband, etc. The effectiveness of such systems may vary depending upon the application. While some systems may be especially effective for certain applications, the cost for such systems may be prohibitive.

Some conventional systems attempt to identify explosive devices. However, in certain applications, such as detection of a person carrying an Improvised Explosive Device (IED), the effectiveness of known systems is less than desired.

SUMMARY

In one aspect of the invention, a method comprises transmitting and receiving wireless signals from nodes in a sensor field covering an area, the sensor field providing a first sensor, receiving information from a second sensor covering at least a portion of the area, determining a size of a target in the area from the first sensor information, wherein the size of the target from the first sensor information is affected by dielectric constants for at least one material of interest associated with the target, determining a size of the target in the area from the second sensor information, and comparing the size of the target from the first sensor information with the size of the target from the second sensor information to determine whether an anomaly exists based upon the size comparison.

The method can further include one or more of the following features: generating an alert when the anomaly is detected, the second sensor includes a video camera, the at least one material of interest includes an explosive material, using RSSI and LQI information to detect the target, determining an orientation of the target in relation to at least of the nodes, performing additional inspection of the target upon generation of the alert, and/or blocking cell phone signals when the alert is generated.

In another aspect of the invention, a system comprises: a first sensor comprising a sensor field including at least one wireless transmitter nodes and receiver nodes to monitor an area, a second sensor to monitor at least a portion of the area, a signal processing module including a processor to: process information from the first sensor to determine a size of a target in the area from the first sensor information, wherein the size of the target from the first sensor information is affected by dielectric constants for at least one material of interest associated with the target, determine a size of the target in the area from the second sensor information, and compare the size of the target from the first sensor information with the size of the target from the second sensor information to determine whether an anomaly exists based upon the size comparison, and an alert module to generate an alert upon detection of the anomaly.

The system can further include one or more of the following features: the second sensor includes a video camera, the at least one material of interest includes an explosive material, using RSSI and LQI information to detect the target, the signal processing module further determines an orientation of the target in relation to at least one of the nodes, a cell phone signal blocking module to block cell phone signals when the alert is generated, an acoustic sensor to provide information to the signal processing module, and/or the signal processing module tracks the target.

In a further aspect of the invention, an article comprises: a computer readable medium containing non-transitory stored instructions that enable a machine to perform: processing information from wireless signals from nodes in a sensor field covering an area, the sensor field providing a first sensor, processing information from a second sensor covering at least a portion of the area, determining a size of a target in the area from the first sensor information, wherein the size of the target from the first sensor information is affected by dielectric constants for at least one material of interest associated with the target, determining a size of the target in the area from the second sensor information, and comparing the size of the target from the first sensor information with the size of the target from the second sensor information to determine whether an anomaly exists based upon the size comparison, and generating an alert upon detection of the anomaly. The article can further comprise the at least one material of interest including an explosive material and/or the second sensor comprising a video camera.

BRIEF DESCRIPTION OF THE DRAWINGS

The foregoing features of this invention, as well as the invention itself, may be more fully understood from the following description of the drawings in which.

DETAILED DESCRIPTION

In general, exemplary embodiments of the invention provide methods and apparatus for detecting objects/materials of interest, such as improvised explosive devices (IEDs), which can be carried by a person, vehicle, or other target. In one embodiment, a person or target moving through a mesh communications network is detected. A coarse target size for the detected person can be determined from information collected as the target moves through the network. The target size from the network can be compared against a target size determined from a different type of sensor, such as a manual or automated video system.

Sensor information can be processed using phenomenology related to measurements based on different materials. From the coarse target size, the system can identify anomalies against visual measurements, for example, caused by different materials. If an anomaly is detected, an alert can be generated and/or further manual or automated target interrogation can occur.

Exemplary embodiments of the invention can utilize various types of radio frequency (RF) transmissions, and receptions, from systems that include communication, broadcast, and radar systems. Such systems can be active, where RF transmissions are generated for subsequent detection, and/or or passive, where ambient RF transmissions are detected and their effect on the target is also detected and measured.

In one embodiment, a system identifies anomalies based the dielectric constant of a person/material, e.g., target within a radio frequency (RF) field. After identifying the anomaly, the target can be analyzed manually and/or automatically by secondary surveillance technologies and/or processes. The identification of anomalous dielectric constant information returned from a person/target at stand-off ranges, which does not match the target visual information, can be the basis for secondary screening and/or caution.

In exemplary embodiments, RF measurements can be processed to characterize target body size. For example, RF measurements can be derived from body mass. In addition, water content RF measurements change depending on material in the RF field by amplifying or reducing the RF measurements. Further, materials, such as metals or plastic explosives, may alter, e.g., amplify or attenuate, the RF measurement signature of the target to highlight an anomaly between the reported measurements and actual size. These anomalies may be automatically identified by comparison to measurements from another sensor modality, such as video. In other embodiments, interrogation can include millimeter wave (mm W), magnetics, lasers and the like targeting the detection of person borne IEDs.

Figure 1:
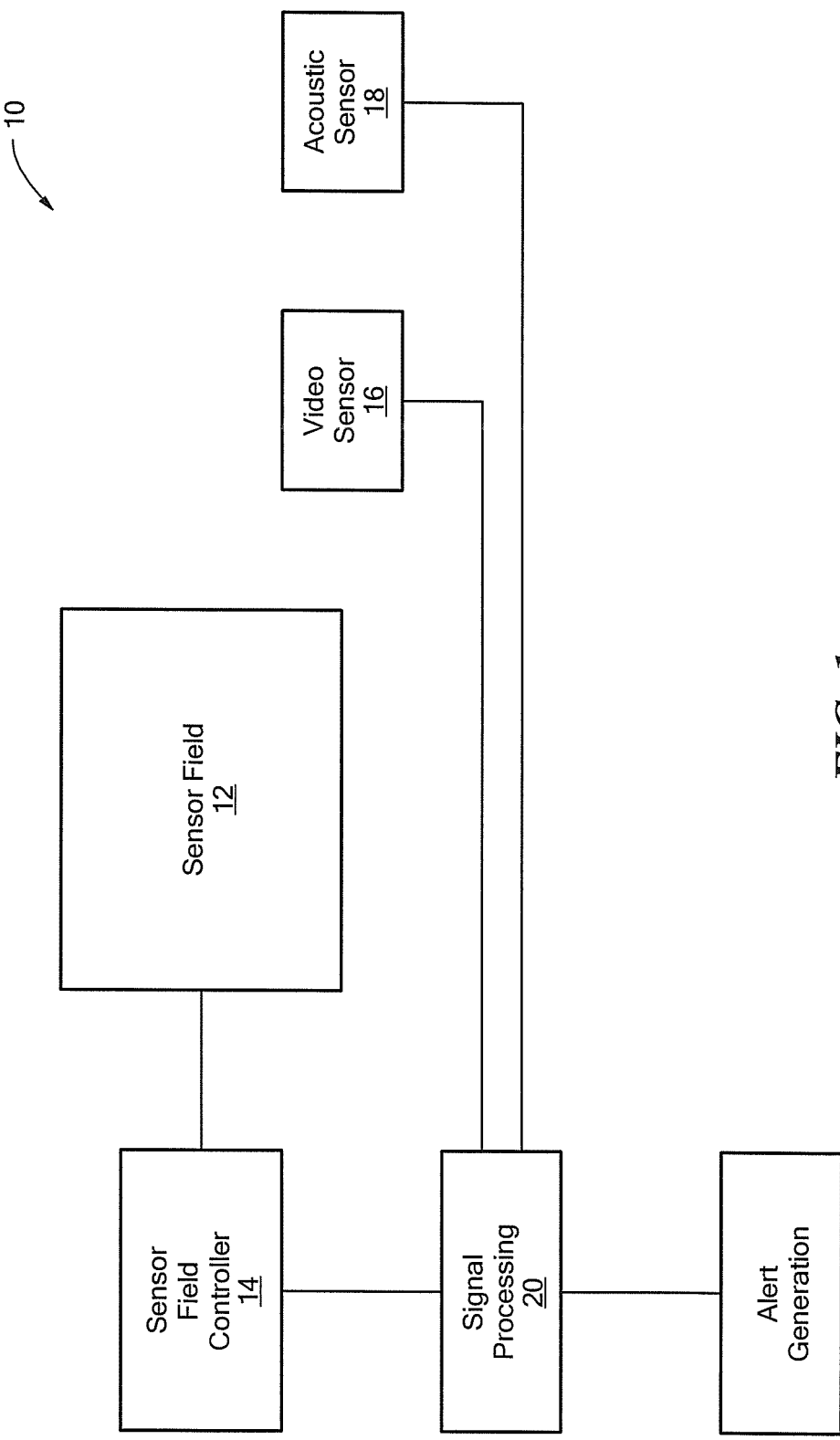
FIG. 1 is a block diagram of an object/material detection system.

FIG. 1 shows an exemplary detection system 10 having a sensor field 12 coupled to a sensor field controller module 14. In one embodiment, the sensor field 12 includes a series of transceiver nodes that exchange wireless signals, as explained more fully below. The detection system 100 further includes a further sensor(s) to collection information for further processing of target information detected by the sensor field. In one embodiment, the detection system 100 includes a video sensor 16 to collect video information for the target. The detection system 100 can further include an acoustic sensor 18 and/or other sensor types to collect information for the target.

It is understood that a variety of sensor types can be used to collect information for further analyzing the target information from the sensor field 12. Exemplary sensors include video, acoustic, infra red, heart rate monitor, breathing rate, and the like. These sensors can be used to further process target information to reduce false detections, etc.

The sensor field controller module 14, the video sensor 16 and other sensors, e.g., acoustic sensor 18, are coupled to a signal processing module 20 to process the sensor information for detecting objects/materials, as described more fully below. It is understood that any practical type and number of sensors can be used to provide information for use in conjunction with coarse target size information derived from the dielectric constant of the object/material.

Figure 2:
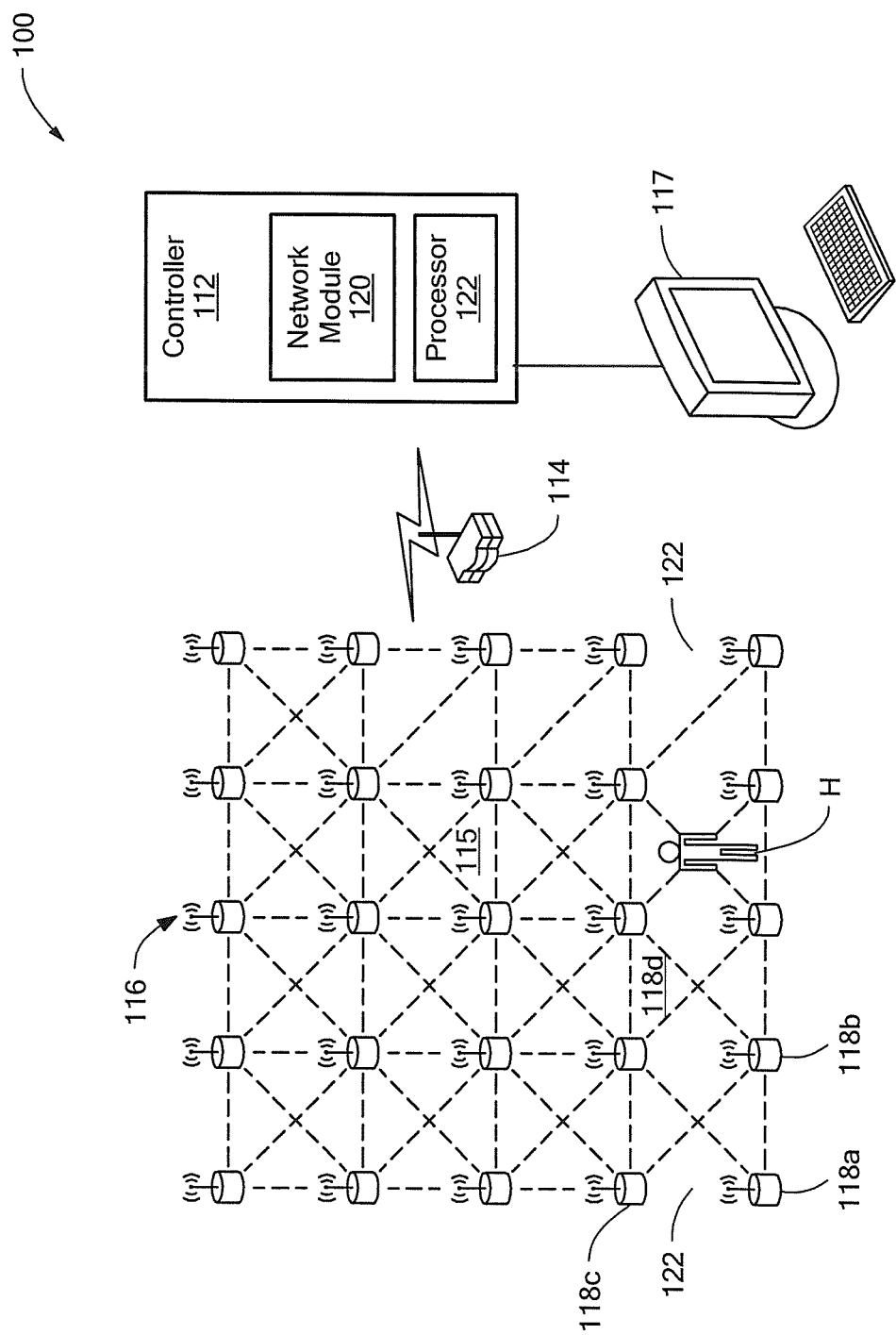
FIG. 2 is a block diagram showing a sensor field forming part of an object/material detection system.

FIG. 2 shows an exemplary sensor field 100 to detect movement of a target in a given area. It is understood that the sensor field can detect a variety of targets, such as persons, vehicles, robots, animals, etc. The sensor field 100 monitors changes in an electromagnetic field (EMF). In particular, if an object moves between a receiver and a transmitter EMF characteristics from the perspective of the receiver change. For example, the receiver will determine whether a link quality between the transmitter and the receiver has changed. In another example, the receiver will determine whether a received signal strength of a transmitted signal from the transmitter has changed. In one particular example, when a first node receives a signal from a second node, the second node will determine a received signal strength indicator (RSSI) and a link quality indicator (LQI) based on the signal received from the first node. Changes in received signal strength (e.g., RSSI) and link quality (e.g., LQI) are used to determine if a target has entered the surveillance area and to track the target.

The sensor field 100 monitors an area 115 for intrusion, such as by human H. In one embodiment, the sensor field 100 includes a wireless network 116 coupled to a controller 112 via an access point 114 and a workstation 117. For example, the wireless network 116 monitors the area 115 and provides data wirelessly to the access point 114. The access point 114 is used to form a data link between the network 116 and the controller 112. In one particular example, the access point 114 comprises a router.

The wireless network 116 includes nodes 118 disposed in the detection area 115. For example, the wireless network 116 includes a node 118a, a node 118b, a node 118c and so forth for monitoring area 115. Nodes communicate with other nodes through a wireless link 122. Each of the nodes 118 processes EMF data and reports changes in the EMF to the access point 114 for processing.

In one example, the nodes 118 in the network 116 use a communication protocol when communicating with each other that includes values for a received signal strength indicator (RSSI) and a link quality indicator (LQI) in any transmitted frame. For example, when a node 118a receives a signal from another node 118b, the node 118a fills in the RSSI and LQI data (e.g., in a header) based on the signal it received from the node 118b. In one example, the communication protocol is the IEEE 802.15.4 communication protocol. It should be appreciated that other suitable protocols can also be used.

In one embodiment, the nodes 118 are system-on-chip devices (SoCs) deployed in a grid along a perimeter or border of the detection area 115 to form an ad-hoc wireless network 116. While FIG. 2 shows the nodes 118 forming an orderly grid, it will be apparent to one of ordinary skill in the art that the nodes 118 need not be located in an orderly manner to form the ad-hoc wireless network 116. Furthermore, any practical number of networks containing any practical number of nodes can be used. In addition, in one embodiment, the nodes 118 are arranged to cover three-dimensions (3-D) in order to provide surveillance over a volume (e.g., buildings).

The controller 112 includes a network module 120 and a processor 122. The network module 120 is configured to monitor and control transmission power, power consumption, etc., of the nodes 118, the access point 114, and the controller 112. In addition, the network module 120 may be used to set parameters such as a measurement value threshold, a detection threshold value and configuration parameters. The processor 122 processes the data received from the access points 114 to correlate and track intrusion detections.

Figure 3A:
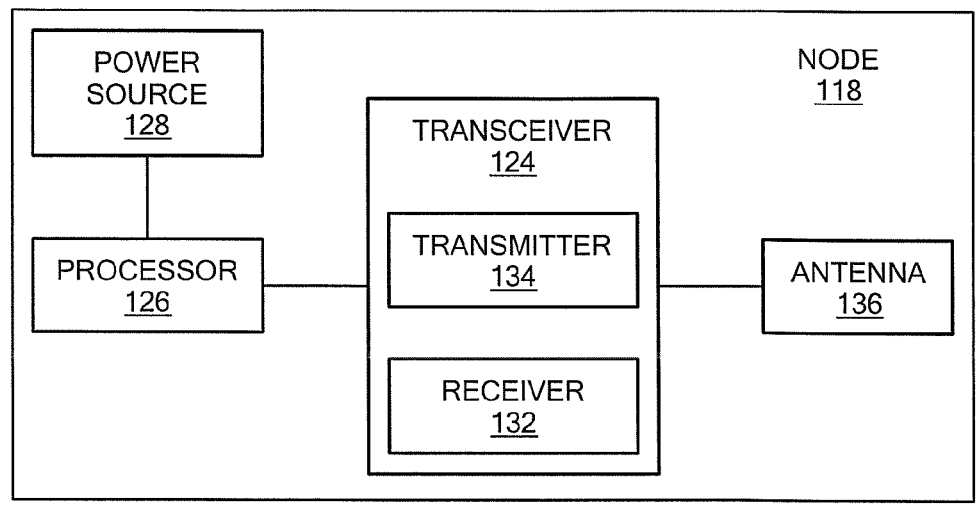
FIG. 3A is a block diagram of an example of a node in the sensor field of FIG. 2.

Referring to FIG. 3A, in one example, each node 118 includes a transceiver 124 that is coupled to a processor 126 and an antenna 136. The processor 126 is powered by a power source 128 (e.g., a battery, a battery 128 that stores energy provided by solar panels and so forth). The processor 126 receives and processes data received from the transceiver 124, for example, from other nodes 118 and provides detection data to the access points, 114. In other examples, the processor 126 receives and processes data (e.g., configuration data) received from the transceiver 124 sent by the controller 112 through the access point 114.

As the transceiver 124 radiates outward from the antenna 136, electromagnetic waves are reflected by the obstacles they strike and their directions of travel are altered. A fraction of their energy is also absorbed by the struck obstacle causing attenuated waves that proceed in the original direction of travel. As a result, different out-of-phase direct, reflected, and absorbed waves are received by the antenna 136 of other nodes, and their instantaneous vector sum determines the received signal energy. These EMF changes can be detected by detecting changes in received signal strength (e.g., RSSI) and changes in link quality (e.g., LQI).

Figure 3B:
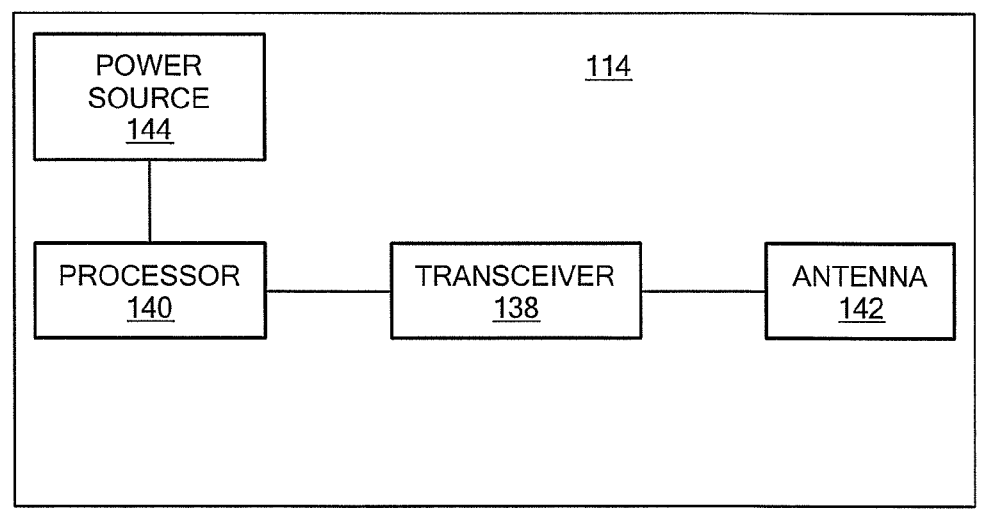
FIG. 3B is a block diagram of an example of an access point in the sensor field of FIG. 2.

Referring to FIG. 3B, in one example, the access point 114 includes a transceiver 138 that is coupled to a processor 140 and an antenna 142. The processor 140 is powered by a power source 144 (e.g., a battery, a battery and solar panels, a wall outlet and so forth). The processor 140 receives and processes data received from the transceiver 138, for example, from the nodes 118 and provides the data to the controller 112. The access point 114 may also receive data (e.g., configuration data) from the controller 112 to provide to their respective nodes 118 or to process at the access point 114.

Figure 4B:
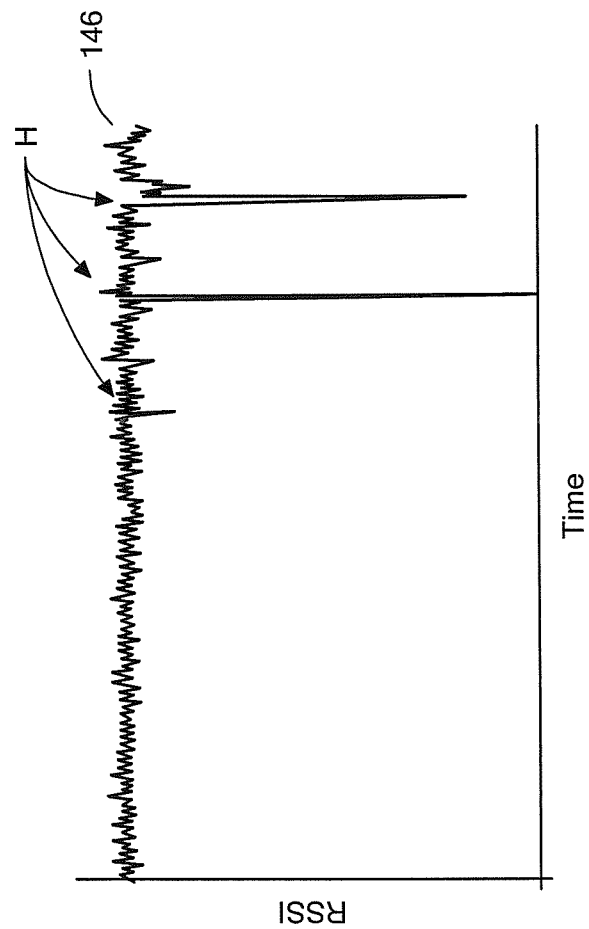
FIG. 4B is a graph of variations caused by the human target in FIG. 4A.
Figure 4A:
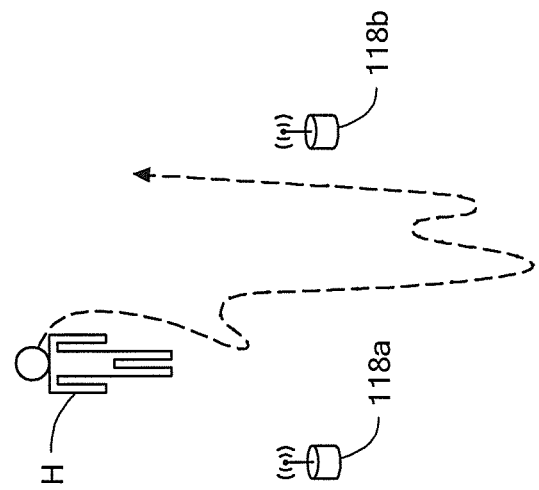
FIG. 4A is a perspective view of a human target travelling between two nodes in a sensor field.

Referring to FIGS. 4A and 4B, for a stationary pair of nodes 118a, 118b, any change in the position of obstacles in the area 115, covered by a transmitter 134 of a node 118a will affect the received signal strength and the link quality values determined at the receiver 132 of the node 118b and vice versa. For example, a moving obstacle in the range of a transmitter 134 of the node 118a will change the values of the RSSI and the LQI determined at the receiver 132 of the node 118b, and these variations can be analyzed to both detect and track intrusions in the area 115. In FIG. 4B, a right-side of a graph 146 shows the effect on the RSSI value caused by a human target H arbitrarily moving between the pair of nodes 118a, 118b.

Figure 4D:
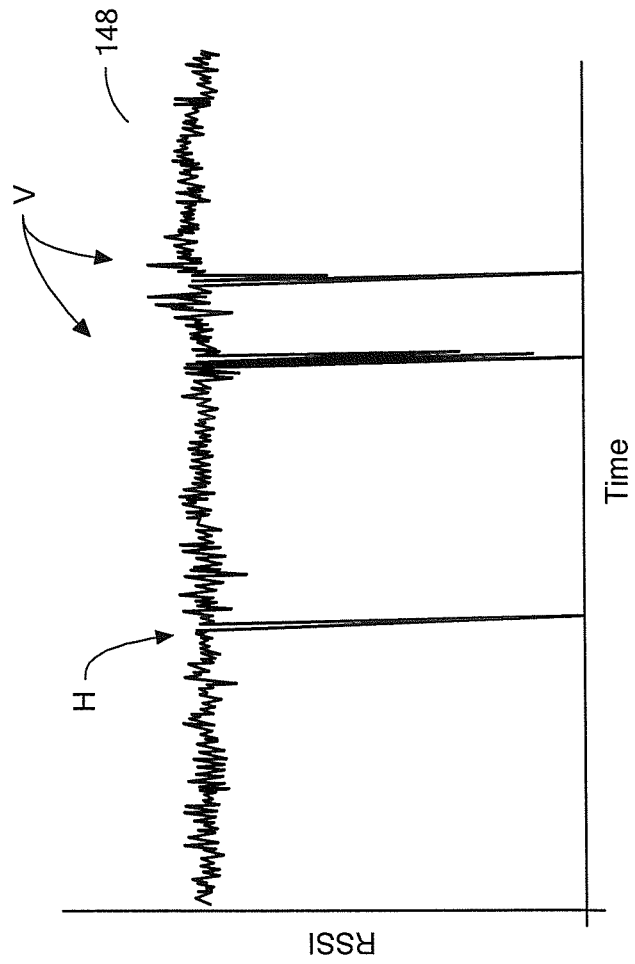
FIG. 4D is a graph of variations caused by the human target and the vehicle in FIG. 4C.
Figure 4C:
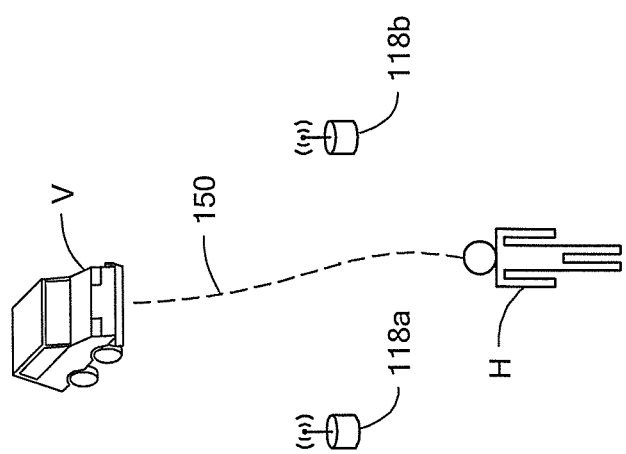
FIG. 4C is a perspective view of a human target and a vehicle between two nodes in a detection system.

FIGS. 4C and 4D show an example wherein an obstacle passes between the nodes 118a, 18b spaced apart by about 25 feet in an outdoor setting with the transmitters 134 and receivers 132 of each node 118a, 118b using the IEEE 802.15.4 protocol, for example. The RSSI value is as reported by the receiver 132. In FIG. 4D, the RSSI variations in a left portion of a graph 148 are caused by a human target H walking along an approximate center line path 150 between the nodes 118a, 118b. A right portion of the graph 148 shows RSSI variations caused by a vehicle V (e.g., a ground vehicle) driven back and forth along the same path 150. While FIGS. 4B and 4D show changes in RSSI values when objects move near nodes 118a, 118b, corresponding changes in LQI can also occur though not depicted herein. Further detail of an exemplary detection system is show and described in commonly owned U.S. Patent Publication No. 2012/0025849, published on Feb. 2, 2012, and filed on Jul. 22, 2011, which is incorporated herein by reference.

It is understood that any suitable frequency can be used to communicate between nodes. An exemplary frequency range is from about 100 MHz to about 10 GHz. A particular frequency, or frequency range, can be selected based upon a variety of parameters, such as multipath interference, clutter, power constraints, available spectrum considerations, etc. In addition, a frequency or frequency range can be dynamically selected based on performance feedback. For example, a range of frequencies can be used and evaluated to determine an optimal frequency. Also, it is understood that one or more transmitters and receivers can be used to meet the needs of a particular application. For example, one transmitter and multiple receives can be used. Alternatively, the transmitting node can move from one node to another.

In one embodiment, 2.4 Ghz, which is a widely used communication frequency, is used. In another embodiment, 900 Mhz and/or 433 Mhz are used to achieve enhanced target detection in high clutter environments.

Figure 5:
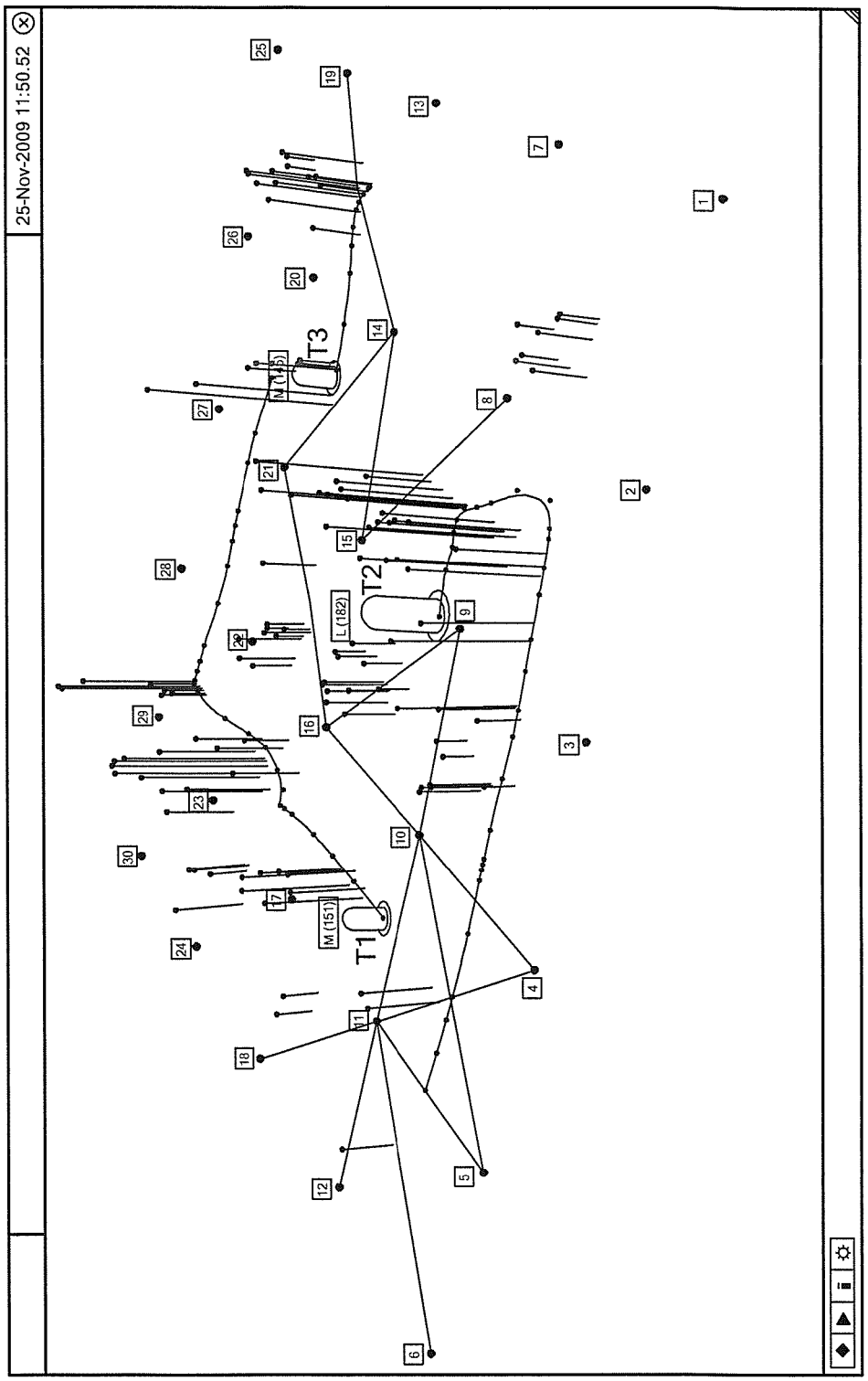
FIG. 5 is a representation of target size and location in a sensor field.

FIG. 5 shows an exemplary area having various sensors to detect targets. As can be seen, the size of the targets can be determined from the RF return. In the illustrated embodiment, three targets T1, T2, T3 of varying size are shown in the sensor field. In addition, the targets T1, T2, T3, track and movement history is shown for each target by the track path line and vertical lines with various sensor measurements aggregated into target tracks. The RF measurements are compounded to provide relative target sizing. It is understood that the received measurements are analyzed to only produce a track if a real target exists taking into account the effects of multipath for reducing false detections.

Referring again to FIG. 1, with target size determined from the sensors, as described above, information from the video sensor 16 can be processed for comparison with the sensors in the sensor field 12 to determine if there is agreement. It is well known in the art to determine the size of a target at a known distance using a video stream.

Figure 6:
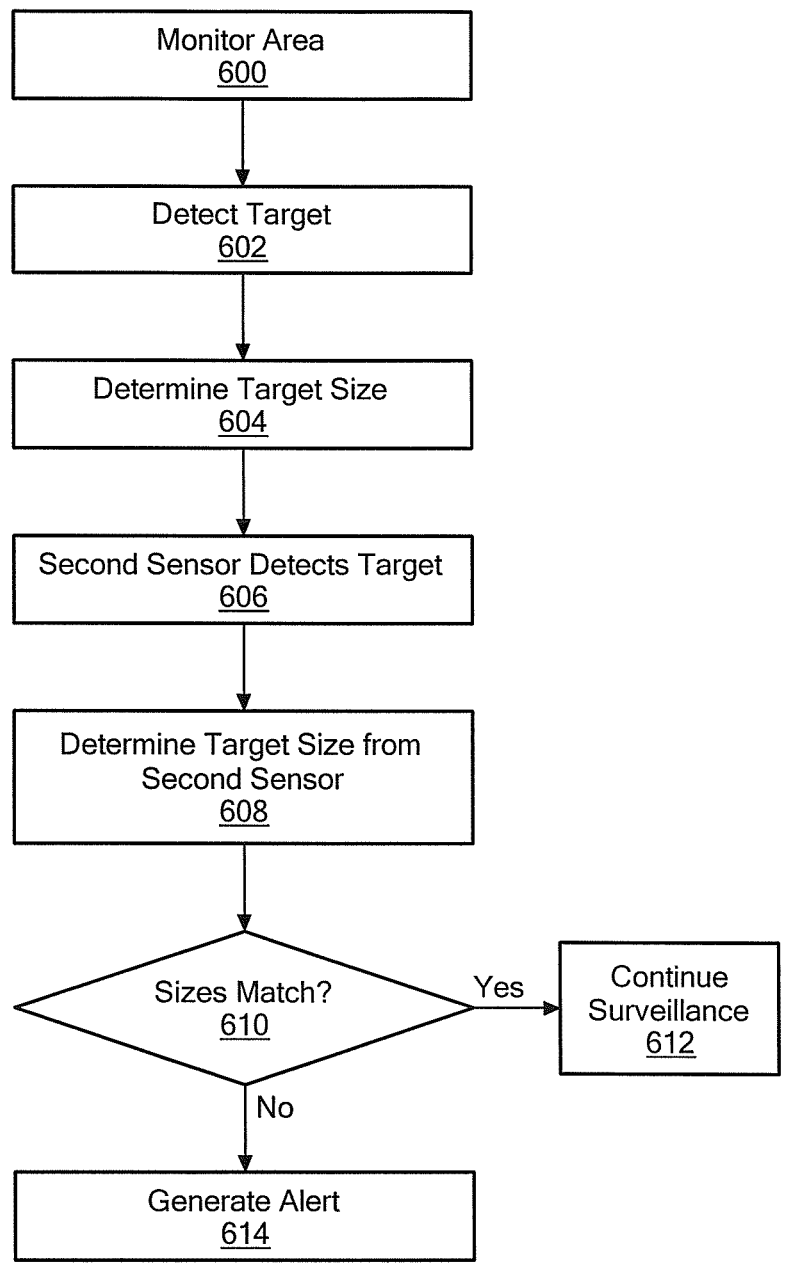
FIG. 6 is a flow diagram showing an exemplary sequence of steps for implementing object detection.

FIG. 6 shows an exemplary sequence of steps for detecting targets of interest. In step 600, a sensor field monitors an area covered by the sensors in the sensor field. In step 602, a target in the area is detected and in step 604 a size of the target is determined from sensor information in the area. In step 606, a second sensor type detects the target and in step 608 a target size is determined from the second sensor information, e.g., video information. In step 610, it is determined whether the size estimates from the sensor field information and the second sensor match within a selected threshold, such as within ten percent. If the target size estimates match, surveillance of the target continues in step 612. If not, in step 614, an alert is generated.

It is understood that the alert can comprise a variety of forms depending upon the application. In one embodiment, an alert comprises part of a message to a notification system (display or audible) that indicates an anomalous situation with respect to a target track has been detected. The alert serves to cause further or secondary investigation of the target. In an exemplary embodiment, an alert is raised by a command and control system that takes in sensor measurements of various types and processes the alerts. If the result is above a selected threshold, then the system generates an anomaly detection, which will then be processed by an alert generation module.

For example, in one embodiment, an alert triggers a cell phone blocking system to prevent cell phone detonation of an IED, for example. In another embodiment, an alert indicates that security personnel should investigate a target. In a further embodiment, additional detection systems are activated to further interrogate the target.

Exemplary applications include crowd surveillance, airport surveillance, culvert awareness for IEDs, perimeter security, forward operating base (FOB) protection, checkpoint security, etc. Further applications will be readily apparent to one of ordinary skill in the art without departing from the scope of the claimed invention.

In one embodiment, back-scatter analysis is performed to analyze the impact of dielectric properties of materials associated with the target. Using known dielectric constants, the signal field strength of targets, such as human targets, can be analyzed to detected anomalies.

Table 1 below shows certain characteristics for the listed materials. As is known in the art, the absolute complex permittivity of a material is represented by the symbol $\in$, where $\in = \in' - j\in''$. This is related to the dimensionless relative complex permittivity $\in_r$, where $\in_r = \in'_r - j\in''_r$, by the expression $\in = \in_0 \in_r$, $\in_0$ being the permittivity of free space. $\delta$ is known as the loss angle, and tan $\delta$ is known as the loss tangent.

TABLE 1

Material Dielectric Properties

| Material | Σ | tan δ | $\in_c/\in_o$ |
|---|---|---|---|
| Muscle | 2.17 | — | 47.0 − j 16.3 |
| Metal | — | — | 1.0e+012 |
| TNT | — | 0.0018 | 2.9 − j 0.005 |
| Water | — | 0.157 | 76.7 − j 12.0 |

Figure 7:
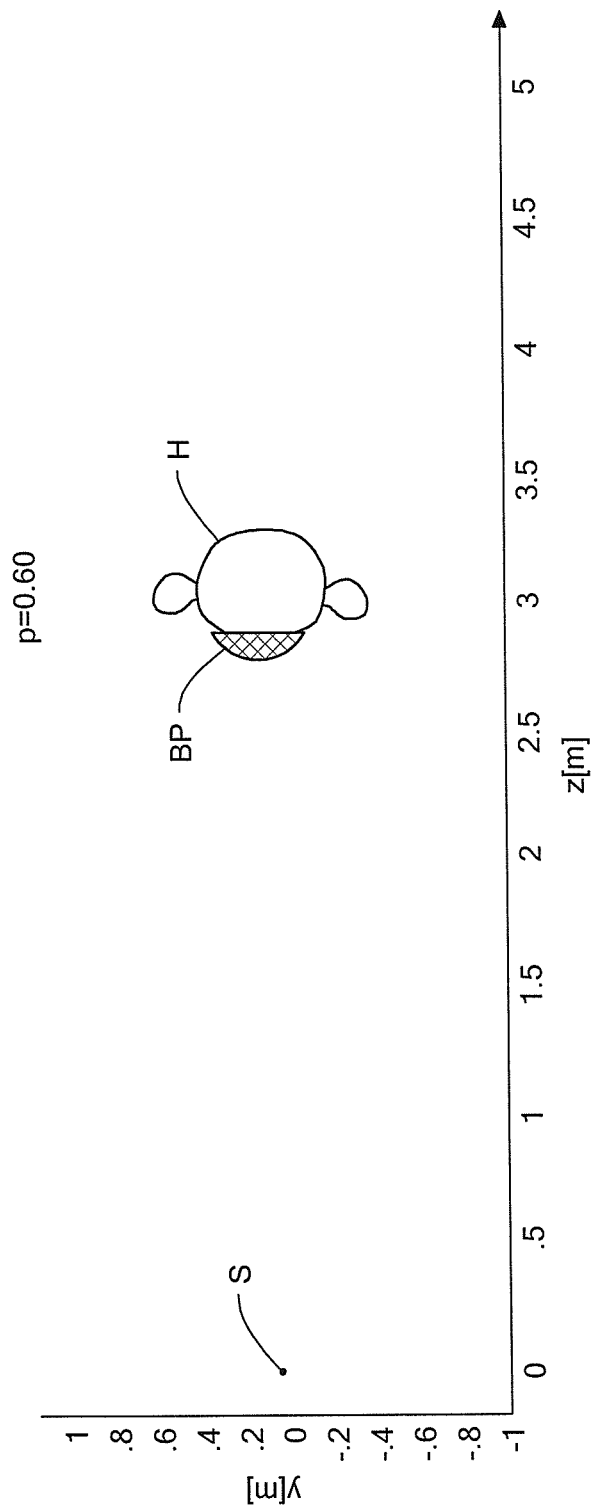
FIG. 7 is a graphical representation of a human with a backpack using back-scatter.

FIG. 7 shows a two-dimensional top view of a human target H with a backpack BP using a single sensor S to detect RF measurement anomalies caused by carrying materials in the backpack BP and to determine the aspect of a target against the sensor S.

Figures 8A, 8B:
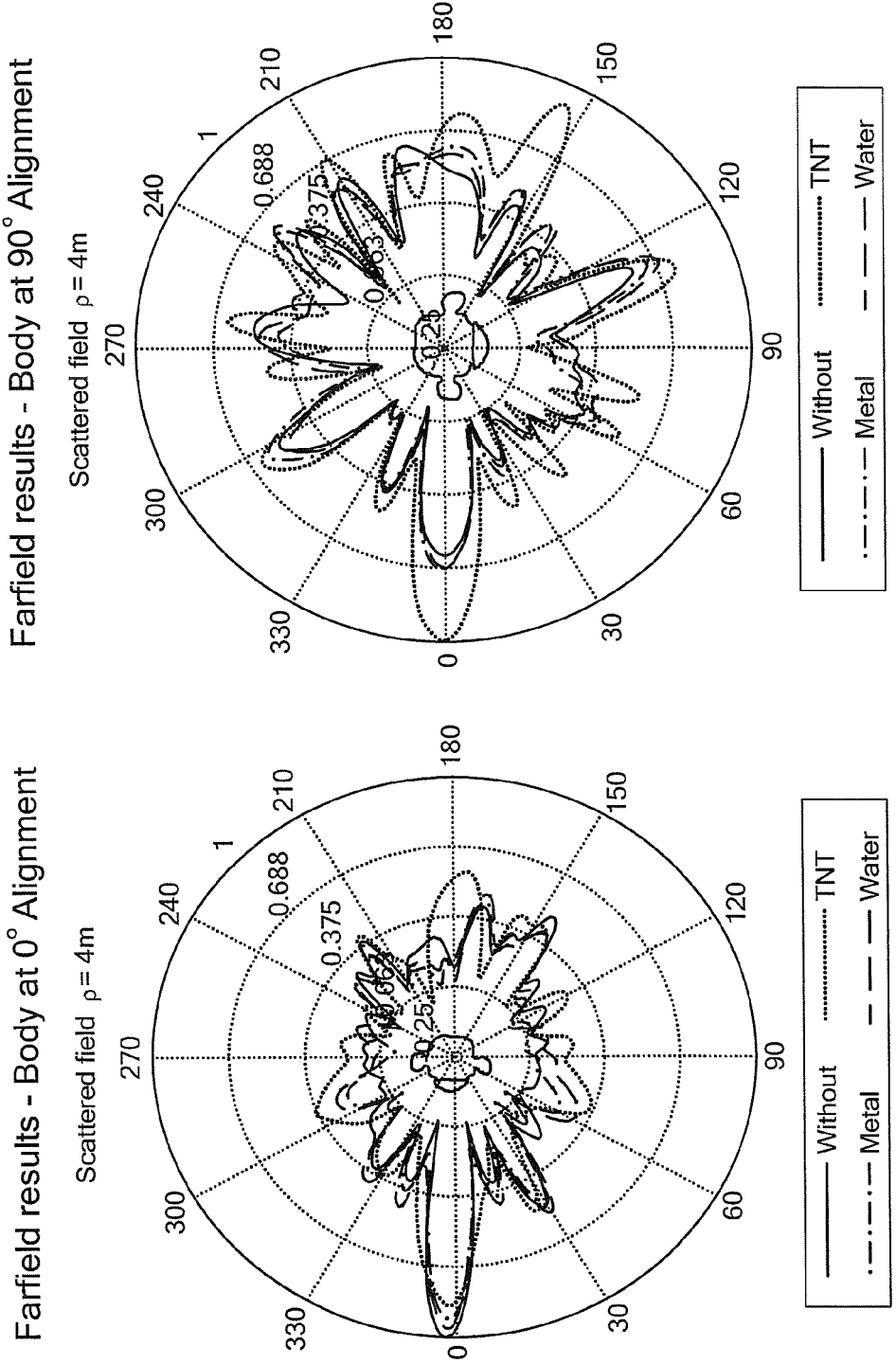
FIG. 8A is a graphical representation of farfield results for a first target alignment and FIG. 8B is a graphical representation of farfield results for a second alignment.

FIGS. 8A and 8B shows bi-static scattered electric far-field results. FIG. 8A shows a human body at 0 degree alignment and FIG. 8B shows the human body at 90 degree alignment with respect to sensor S. A single source was used to determine the effect of dielectric materials on received RF measurements and determine the effect of aspect on the RF measurements.

As can be seen in FIG. 8A in conjunction with FIG. 7, when a sensor S points directly at the backpack BP on a target human H, RF signals are scattered/radiated at all angles. The materials are placed individually into the backpack BP on the target. The plot shows that there are RF measurement differences, i.e., amplifications and reductions, caused by the different materials on the received signal.

Materials were placed in the backpack BP to measure the effects of different materials placed on the same location on the target H. In general, the locations of the materials do not affect the anomaly alerting system.

The effect of aspect and alignment includes amplitude RF measurement increases at certain orientations. Utilizing sensors at various angles from the target H allows for processing to discriminate and detect of anomalies caused by different materials. Different dielectric materials cause different scattering of the RF field at different angles with respect to either amplitude or reduction of the RF measured signal.

Figure 8C:
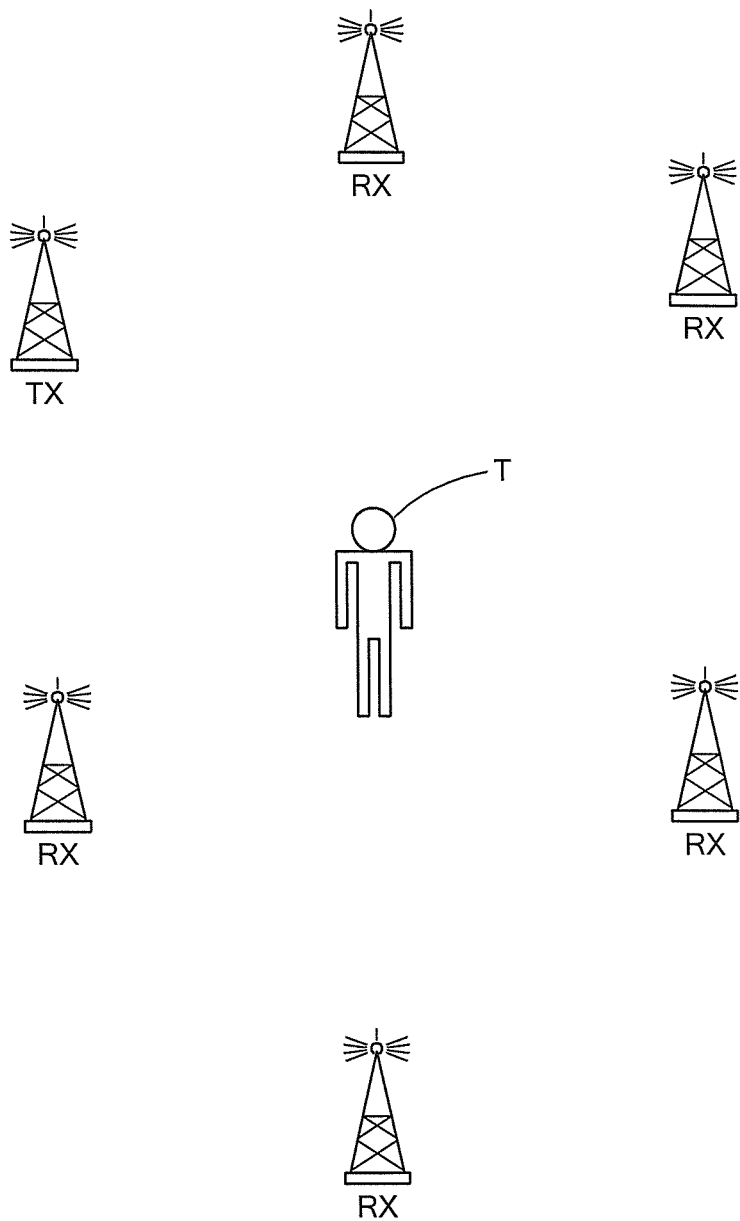
FIG. 8C is a schematic representation of a transmitter and multiple receivers in an object/material detection system and 8D is a schematic representation of a transmitter in a different location.
Figure 8D:
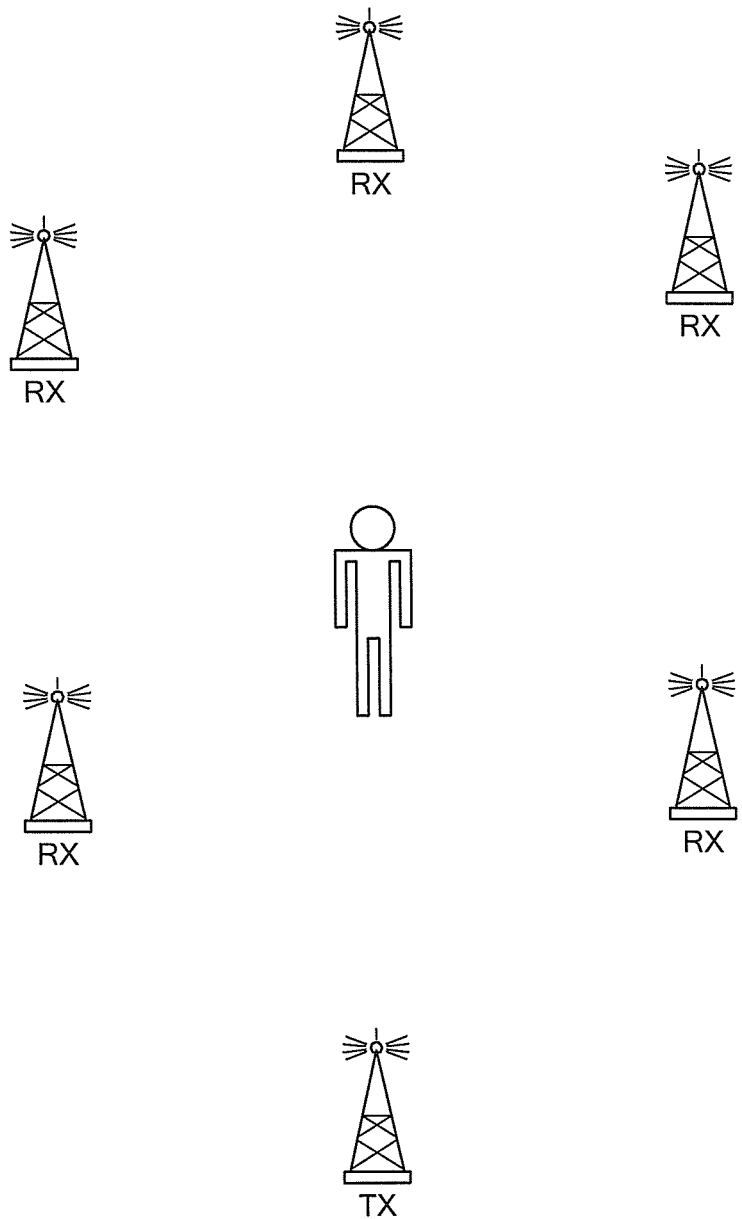
FIG. 8E is a flow diagram showing an exemplary sequence of steps to collect RF information.

FIG. 8C shows exemplary object detection using a transmitter TX and a series of receivers RX to detect a target H. FIG. 8D shows alternative object detection using a transmitter TX and different multiple receivers RX.

Figure 8E:
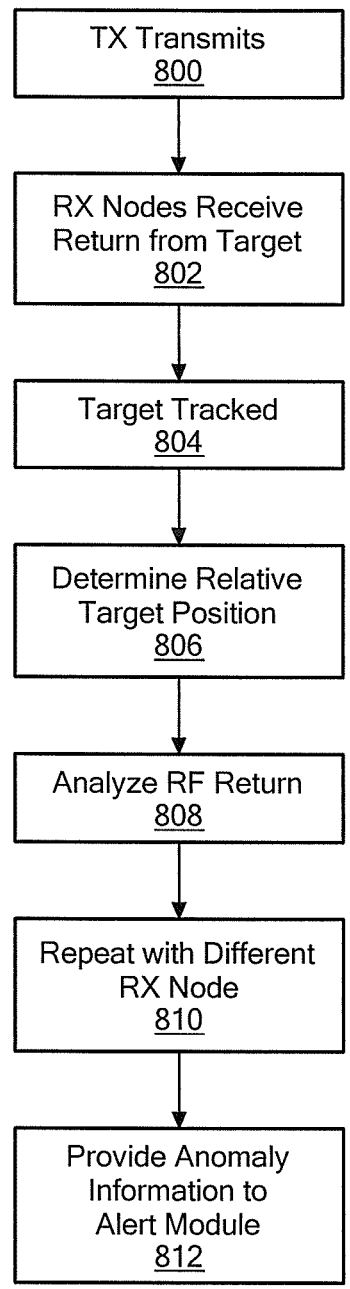

FIG. 8E shows an exemplary sequence of steps to detect an object/material in conjunction with FIGS. 8C and 8D. In step 800, a transmitter node TX transmits a signal that impinges on a target T. Receiver nodes RX received scattered signal return from the target T in step 802. In step 804, the system tracks the target T. Once track is established, for each receive node RX, the relative position of the target T is determined with respect to the transmitter TX in step 806.

In step 808, the system analyzes the RF return to identify anomalies in due to materials of interest associated with the target T. The relative position of the target T in relation to the transmitter TX is determined to take the aspect of the target T into account. The aspect of the target affects magnitude information based on the material of interest and ratio information for comparison against information from other receive nodes RX.

As shown in FIG. 8D, a different transmit node TX can be used to repeat and tune detection information. For example, in optional step 810, information from the receive nodes RX can further confirm and define a probability of detection of the object/material of interest from the RF return information. In step 812, the anomaly information can be provided to a detection/alert module.

Figure 9:
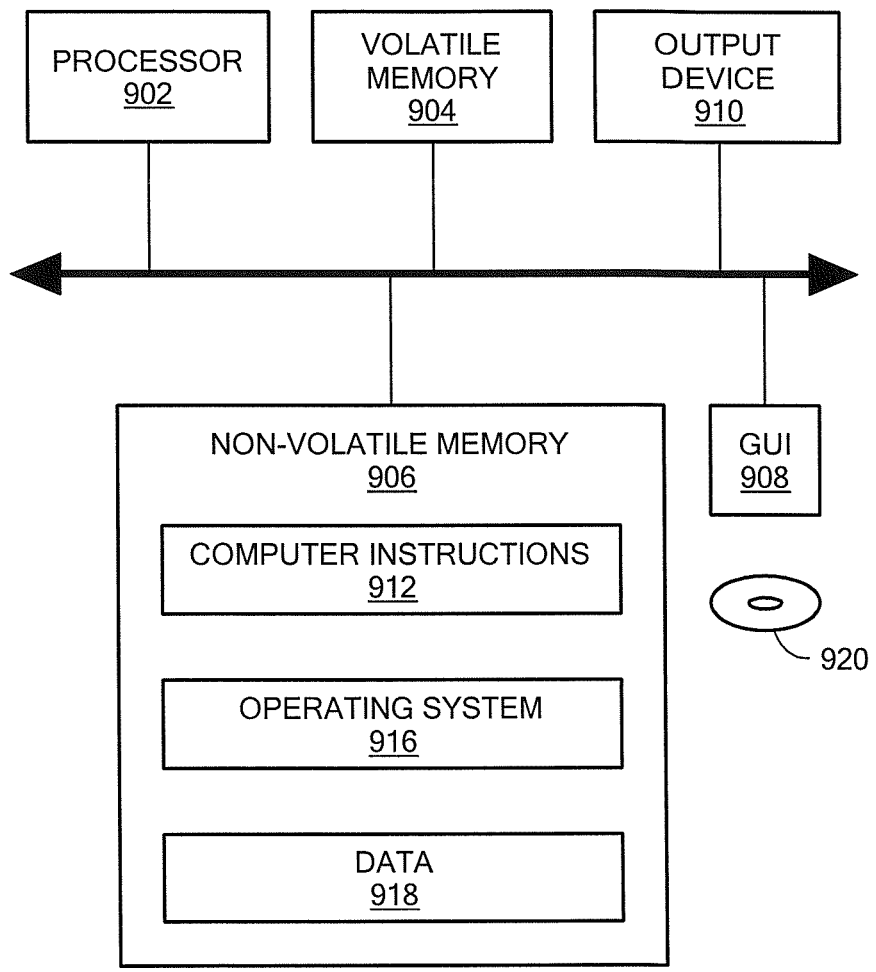
FIG. 9 is a schematic representation of an exemplary computer that can form a part of an object detection system.

Referring to FIG. 9, a computer includes a processor 902, a volatile memory 904, a non-volatile memory 906 (e.g., hard disk), a graphical user interface (GUI) 908 (e.g., a mouse, a keyboard, a display, for example) and an output device 910. The non-volatile memory 906 stores computer instructions 912, an operating system 916 and data 918 including the Q files, for example. In one example, the computer instructions 912 are executed by the processor 902 out of volatile memory 904, and/or article 920.

Processing described herein is not limited to use with the hardware and software of FIG. 9 and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

The processing associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
   transmitting and receiving wireless RF signals from transceivers in a mesh communications network sensor field covering an area, the sensor field providing information from a first sensor;
   receiving information from a second sensor in the mesh communications network covering at least a portion of the area;
   determining a size of a target in the area from the first sensor information from changes in electromagnetic field (EMF) between transceivers caused by the target as the target moves into, out of, or within the sensor field, wherein the size of the target from the first sensor information is affected by dielectric constants for at least one material of interest associated with the target, wherein the changes in the EMF are measured as link quality changes between the transceivers due to the target;
   determining a size of the target in the area from the second sensor information; and
   comparing the size of the target from the first sensor information with the size of the target from the second sensor information to determine whether an anomaly exists based upon the size comparison.

2. The method according to claim 1, further including generating an alert when the anomaly is detected.

3. The method according to claim 1, wherein the second sensor includes a video camera.

4. The method according to claim 1, wherein the at least one material of interest includes an explosive material.

5. The method according to claim 1, further including using RSSI and LQI information to detect the target.

6. The method according to claim 1, further including determining an orientation of the target in relation to at least one of the nodes.

7. The method according to claim 1, further including performing additional inspection of the target upon generation of the alert.

8. The method according to claim 1, further including blocking cell phone signals when the alert is generated.

9. A system, comprising:
   a first sensor comprising a sensor field including at least one wireless transceiver in a mesh communications network to monitor an area;
   a second sensor to monitor at least a portion of the area;
   a signal processing module coupled to the mesh communications network, the signal processing module including a processor to:
   process information from the first sensor to determine a size of a target in the area from the first sensor information from changes in electromagnetic field (EMF) between transceivers caused by the target as the target moves into, out of, or within the sensor field, wherein the size of the target from the first sensor information is affected by dielectric constants for at least one material of interest associated with the target, wherein the changes in the EMF are measured as link quality changes between the transceivers due to the target;
   determine a size of the target in the area from the second sensor information; and
   compare the size of the target from the first sensor information with the size of the target from the second sensor information to determine whether an anomaly exists based upon the size comparison; and
   an alert module to generate an alert upon detection of the anomaly.

10. The system according to claim 9, wherein the second sensor includes a video camera.

11. The system according to claim 9, wherein the at least one material of interest includes an explosive material.

12. The system according to claim 9, further including using RSSI and LQI information to detect the target.

13. The system according to claim 9, wherein the signal processing module further determines an orientation of the target in relation to at least one of the nodes.

14. The system according to claim 9, further including a cell phone signal blocking module to block cell phone signals when the alert is generated.

15. The system according to claim 9, further including an acoustic sensor to provide information to the signal processing module.

16. The system according to claim 9, wherein the signal processing module tracks the target.

17. An article, comprising:
   a non-transitory computer readable medium containing stored instructions that enable a machine to perform:
   processing information from wireless signals from transceivers in a mesh communications network sensor field covering an area, the sensor field providing information from a first sensor;
   processing information from a second sensor in the mesh communications network covering at least a portion of the area;
   determining a size of a target in the area from the first sensor information from based on back-scatter analysis of changes in electromagnetic field (EMF) between transceivers caused by the target as the target moves into, out of, or within the sensor field, wherein the size of the target from the first sensor information is affected by dielectric constants for at least one material of interest associated with the target, wherein the changes in the EMF are measured as link quality changes between the transceivers due to the target;
   determining a size of the target in the area from the second sensor information; and
   comparing the size of the target from the first sensor information with the size of the target from the second sensor information to determine whether an anomaly exists based upon the size comparison; and
   generating an alert upon detection of the anomaly.

18. The article according to claim 17, wherein the at least one material of interest includes an explosive material.

19. The article according to claim 17, wherein the second sensor comprises a video camera.

20. The method according to claim 1, wherein the first sensor comprises a wireless data communication system to receive and transmit data signals within the sensor field, wherein the link quality can be measured as RSSI and LQI for wireless data communication systems.

21. The method of claim 1, wherein the area comprises and open, unenclosed area.

22. The system of claim 9, wherein the area comprises and open, unenclosed area.

* * * * *